(12) United States Patent
Chen et al.

(10) Patent No.: US 8,047,780 B2
(45) Date of Patent: Nov. 1, 2011

(54) ASSEMBLED FAN FRAME

(75) Inventors: Hung-Jen Chen, Taipei (TW);
Hung-Jung Hsia, Taipei (TW)

(73) Assignee: Inventec Corporation, Taipei (TW)

( * ) Notice: Subject to any disclaimer, the term of this patent is extended or adjusted under 35 U.S.C. 154(b) by 395 days.

(21) Appl. No.: 12/396,633

(22) Filed: Mar. 3, 2009

(65) Prior Publication Data

US 2010/0129208 A1 May 27, 2010

(30) Foreign Application Priority Data

Nov. 21, 2008 (CN) .......................... 2008 1 0176810

(51) Int. Cl.
*F03D 5/00* (2006.01)

(52) U.S. Cl. ..................... 415/213.1; 361/695

(58) Field of Classification Search .................. 361/695; 415/213.1

See application file for complete search history.

(56) References Cited

U.S. PATENT DOCUMENTS

| | | | | |
|---|---|---|---|---|
| 4,767,262 A | * | 8/1988 | Simon | 415/119 |
| 5,186,605 A | * | 2/1993 | Tracy | 601/2 |
| 5,788,566 A | * | 8/1998 | McAnally et al. | 454/184 |
| 6,185,097 B1 | * | 2/2001 | Behl | 361/695 |
| 6,236,564 B1 | * | 5/2001 | Fan | 361/695 |
| 6,549,406 B1 | * | 4/2003 | Olesiewicz et al. | 361/695 |
| 6,783,325 B1 | * | 8/2004 | Hileman et al. | 415/213.1 |
| 6,791,836 B2 | * | 9/2004 | Cipolla et al. | 361/679.48 |
| 6,839,233 B2 | * | 1/2005 | Cravens et al. | 361/695 |
| 6,951,446 B2 | * | 10/2005 | Hung | 415/213.1 |
| 7,021,906 B2 | * | 4/2006 | Chang | 417/360 |
| 7,054,155 B1 | * | 5/2006 | Mease et al. | 361/695 |
| 7,168,912 B2 | * | 1/2007 | Sun | 415/66 |
| 7,352,574 B2 | * | 4/2008 | Chen | 361/695 |
| 7,379,300 B1 | * | 5/2008 | Chen | 361/695 |
| 7,385,813 B2 | * | 6/2008 | Lin | 361/695 |
| 7,385,814 B1 | * | 6/2008 | Chen | 361/695 |
| 7,445,430 B2 | * | 11/2008 | Kao et al. | 415/213.1 |
| 7,481,704 B2 | * | 1/2009 | Kao et al. | 454/184 |
| 7,522,415 B2 | * | 4/2009 | Fan et al. | 361/695 |
| 7,771,165 B2 | * | 8/2010 | Chen | 415/213.1 |
| 7,948,755 B1 | * | 5/2011 | Guan | 361/695 |

* cited by examiner

*Primary Examiner* — Jarrett Stark
*Assistant Examiner* — Nicholas Tobergte
(74) *Attorney, Agent, or Firm* — J.C. Patents

(57) ABSTRACT

An assembled fan frame suitable for a case body includes a framework, a plurality of first assemblies, a back slab, and a plurality of second assemblies. The framework includes a fixing slab, a first side wall and a second side wall facing each other, and an accommodation space is defined to accommodate at least one fan module. The fixing slab has at least one first vent and a plurality of first assembling holes which are disposed around the first vent. The first assembly is disposed through the first assembling hole and fastens the fan module on the fixing slab. The back slab is vertically mounted on a surface of the case body and faces the fixing slab. The back slab includes at least one second vent and a plurality of second assembling holes. The second assembly is disposed through the second assembling hole and detachably fixes the framework on the back slab.

9 Claims, 7 Drawing Sheets

ASSEMBLED FAN FRAME

CROSS-REFERENCE TO RELATED APPLICATION

This application claims the priority benefit of Chinese application serial no. 200810176810.7, filed on Nov. 21, 2008. The entirety of the above-mentioned patent application is hereby incorporated by reference herein and made a part of this specification.

BACKGROUND OF THE INVENTION

1. Field of the Invention

The present invention generally relates to a fan frame, in particular, to an assembled fan frame.

2. Description of Related Art

With the development of the technology, commonly used electronic products such as computers, servers, or household appliances have functions diversified along with the progress of the technology, and performances thereof are thus improved. As the performance of each element in the electronic product is improved, the heat produced by the element is also increased, such that the temperature of electronic product when in use is easy to be raised, thus degrading the performance of the electronic product, or even damaging the electronic product. Therefore, the electronic product must use a heat dissipation mechanism to prevent the temperature being too high when in use and to retain the normal operation.

Take a server as an example. In the prior art, a heat sink fan is arranged into a fan frame, an accommodation region of each fan has frame walls at its four sides, and the fan frame is clipped to the case by its two sides. The effect of heat dissipation is achieved by operating the fan to perform air convection. The fan frame is secured on the bottom plate or side plate of the case by using screws, in addition to this, the fan frame mostly use spring sheet and other accessories to be clipped to the case. FIG. 1 shows a fixing structure of a conventional fan frame. The fixing structure 100 includes two mounting brackets 110 and 120 which are disposed on two side walls 140 and 150 of a fan frame 130 respectively. The fan frame 130 is clipped to two fan bearings set on a case body (not shown) by utilizing two pins 160 and a spring sheet 170 disposed on the mounting bracket 120. A heat sink fan (not shown) may be installed within an accommodation space 180 of the fan frame 130. When the heat sink fan is operating, the fan frame 130 may generate noise due to shock, and the fixed structure may absorb the noise generated by shock and reduce the shock resulted from the operation of the fan by arranging an elastic washer 190 at clipping place between the pin 160 and the fan bearing.

However, the design that the accommodation space 180 of the conventional fan frame 130 has frame walls at its four sides increases the contact area between the heat sink fan and the fan frame 130. The fixing structure 100 includes a plurality of assembly accessories, thus resulting in that the fan frame 130 and the fixed structure 100 easily generate shock and noise due to the operation of the fan. In addition, the conventional fan frame 130 has a complicated structure, thus not only increasing the difficulty and cost in manufacturing the fan frame 130, but also resulting in difficulties in assembling the fan frame 130 with a case.

SUMMARY OF THE INVENTION

Accordingly, the present invention is directed to an assembled fan frame to reduce the shock generated by the operation of the fan.

The present invention provides an assembled fan frame including a framework, a plurality of first assemblies, a back slab, and a plurality of second assemblies. The framework includes a fixing slab, a first side wall and a second side wall facing each other. The fixing slab is connected between the first side wall and the second side wall, and the fixing slab, the first side wall, and the second side wall define an accommodation space to accommodate at least one fan module. The fixing slab has at least one first vent and a plurality of first assembling holes which are disposed around the first vent, and an outlet of the fan module faces the first vent of the fixing slab. The first assembly is disposed through the first assembling hole and fastens the fan module on the fixing slab. The back slab is vertically mounted on a surface of the case body and faces the fixing slab. The back slab includes at least one second vent and a plurality of second assembling holes. In addition, the second assembly is disposed through the second assembling hole and detachably fixes the framework on the back slab.

In an embodiment of the present invention, the above framework is an integrally formed п-shaped framework.

In an embodiment of the present invention, the above first assemblies include screw, pin, or tenon.

In an embodiment of the present invention, the above framework further includes a plurality of first folded boards vertically connected to the first side wall and the second side wall respectively, and the second assemblies are assembled on the first folded boards, and protruded to the back slab.

In an embodiment of the present invention, the above second assembling holes are gourdshaped holes each having a first aperture portion and a second aperture portion, and each of the second assemblies is adapted to be disposed through the first aperture portion and fixed in the second aperture portion.

In an embodiment of the present invention, the above second assemblies include screws or pins, each of the second assemblies has a rod body, and a head external diameter of the rod body is smaller than an aperture of the first aperture portion and larger than an aperture of the second aperture portion.

In an embodiment of the present invention, the above framework further includes a plurality of second folded boards and a plurality of third assembling holes on the second folded boards, and the second folded boards are vertically connected with the first folded boards respectively. The back slab further includes a plurality of third folded boards and a plurality of third assemblies protruded from the third folded boards, and the third assemblies are vertical to the surface of the case body and disposed through the third assembling holes.

In an embodiment of the present invention, the above third assemblies include pins or tenons, and a shockproof washer is disposed within each of the third assembling holes to separate each of the third assemblies and each of the third assembling holes.

In an embodiment of the present invention, the above first folded boards and the second folded boards are integrally formed on the framework and protruded from the first side wall and the second side wall respectively.

In an embodiment of the present invention, the above third folded boards are integrally formed on the back slab, and vertically protruded from the back slab.

In view of the above, the structure of the assembled fan frame of the present invention is simple and the quantity of the accessories needed during assembling is small. The design of the fan frame further decreases the contact area between the fan module and the framework, thus decreasing the shock generated by the operation of the fan module.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
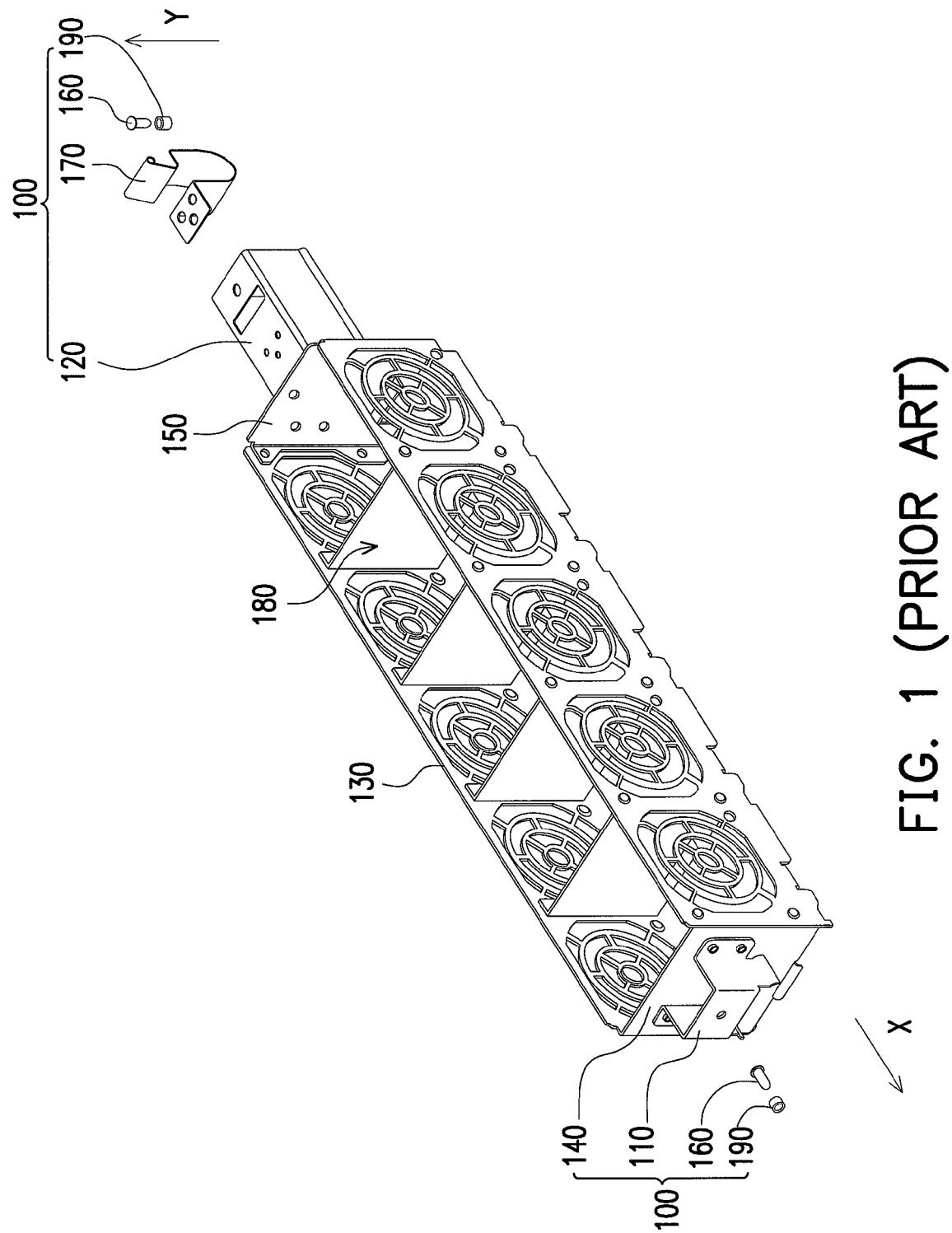
FIG. 1 is a three-dimensional view of a fixed structure of a conventional fan frame.

Reference will now be made in detail to the present embodiments of the present invention, examples of which are illustrated in the accompanying drawings. Wherever possible, the same reference numbers are used in the drawings and the description to refer to the same or like parts.

Figure 2:
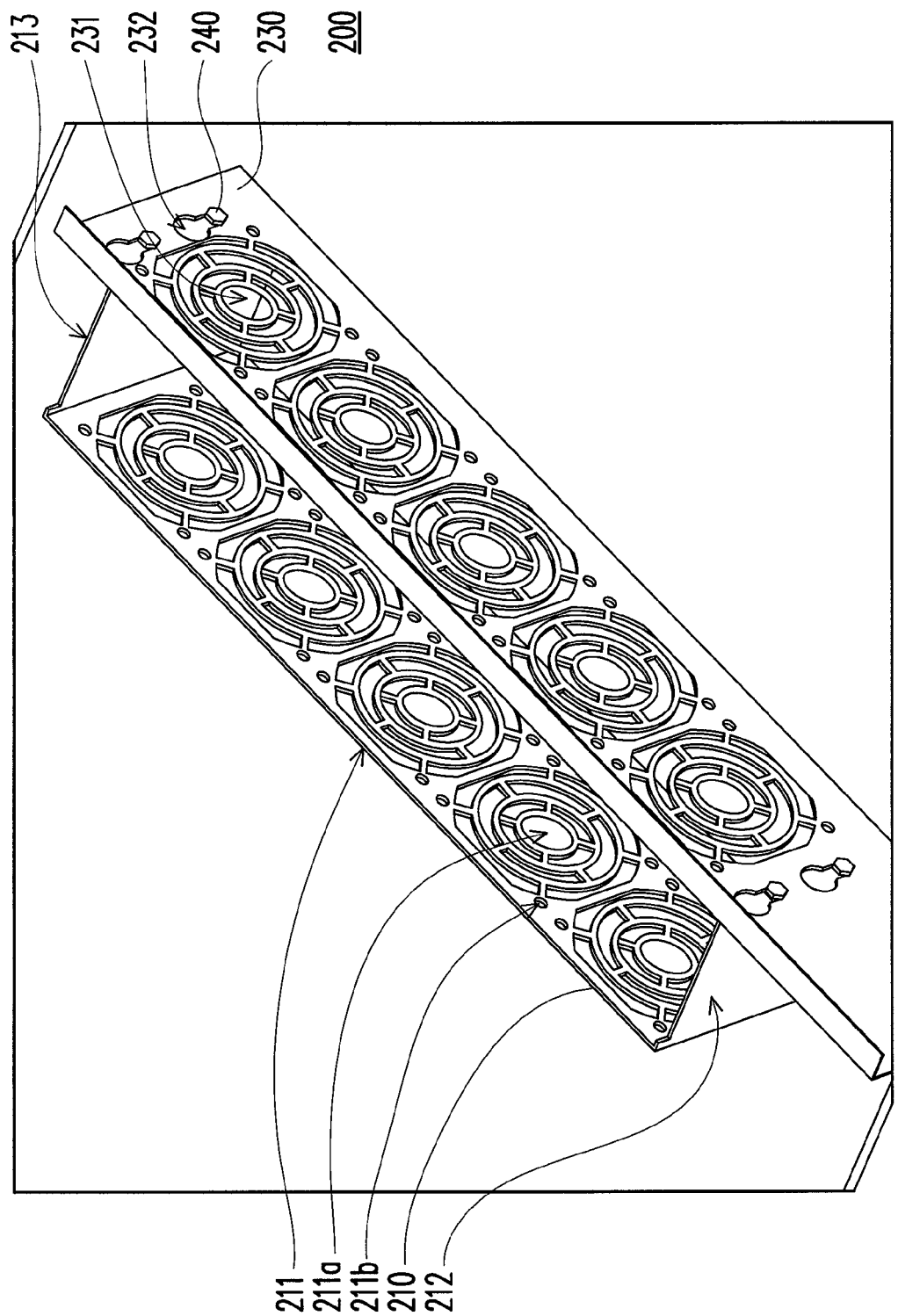
FIG. 2 is a three-dimensional view of an assembled fan frame according to an embodiment of the present invention.

FIG. 2 is a three-dimensional view of an assembled fan frame according to an embodiment of the present invention. Referring to FIG. 2, the assembled fan frame 200 of the present invention may be installed in a case body of a product which generally needs to be equipped with a heat sink fan, such as a computer or a server. The assembled fan frame 200 includes a framework 210 and a back slab 230. The framework 210 includes a fixing slab 211, a first side wall 212 and a second side wall 213 facing each other, and the fixing slab 211 is connected between the first side wall 212 and the second side wall 213. In this embodiment, the fixing slab 211, the first side wall 212 and the second side wall 213 described above can be a n-shaped framework formed into one piece, and thus define an accommodation space. The fixing slab 211 has at least one first vent 211a and a plurality of first assembling holes 211b which are disposed around the first vent 211a.

Figure 3:
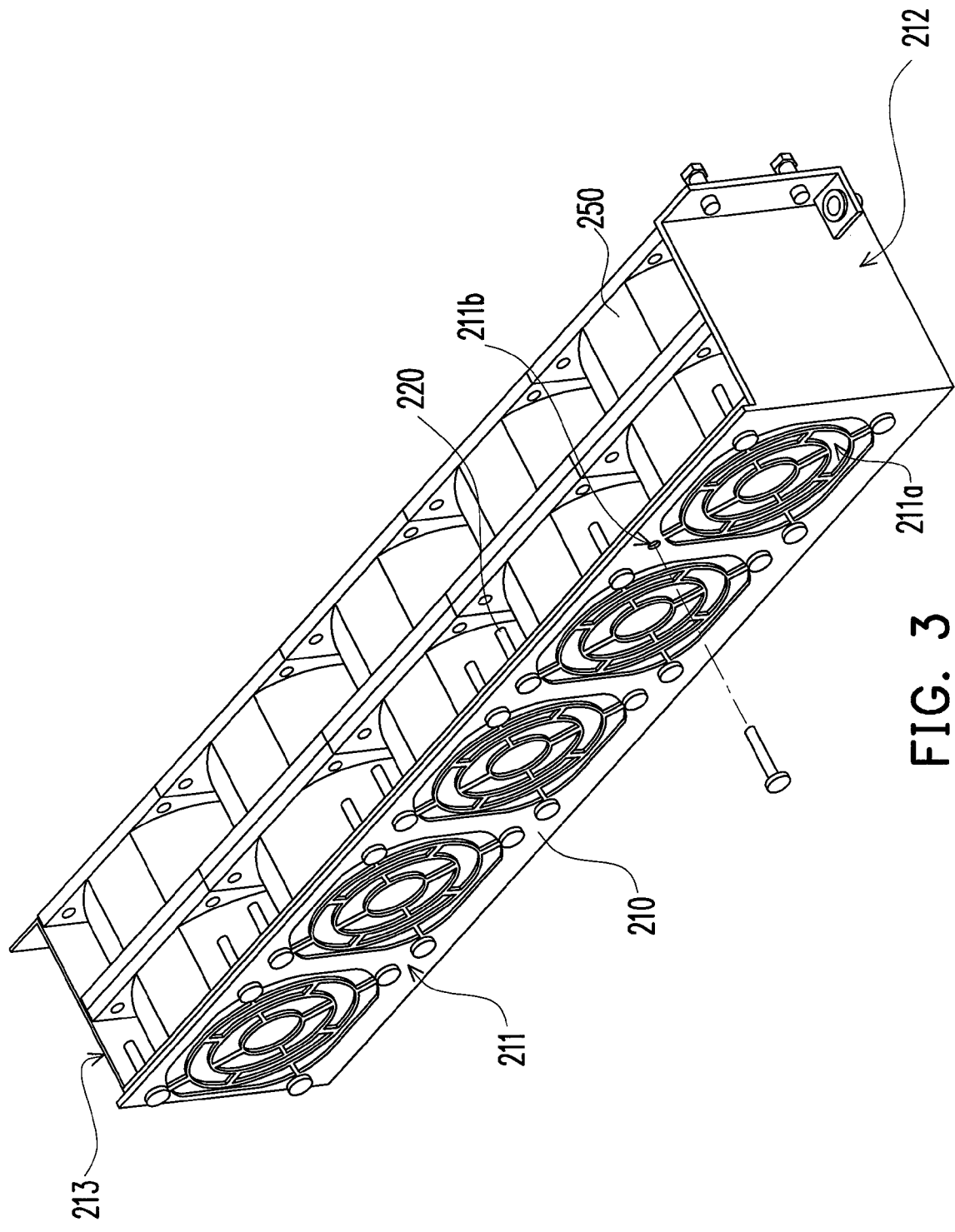
FIG. 3 is an assembled three-dimensional view of a framework and a fan module according to an embodiment of the present invention.

FIG. 3 is an assembled three-dimensional view of a framework and a fan module according to an embodiment of the present invention. Referring to FIG. 3, when the fan module 250 is assembled with the framework 210, the fan module 250 can be disposed within the accommodation space defined by the fixing slab 211, the first side wall 212 and the second side wall 213. By penetrating a plurality of first assemblies 220 (e.g. assemblies such as screws, pins, or tenons) through the first assembling holes 211b, the fan module 250 can be clipped to the fixing slab 211 by one side. The outlet of the fan module 250 faces the first vent 211a of the fixing slab 211 during fixing, such that the hot air driven by the operation of the fan module 250 is easily to be vented, thereby achieving the effect of heat dissipation.

Figure 4:
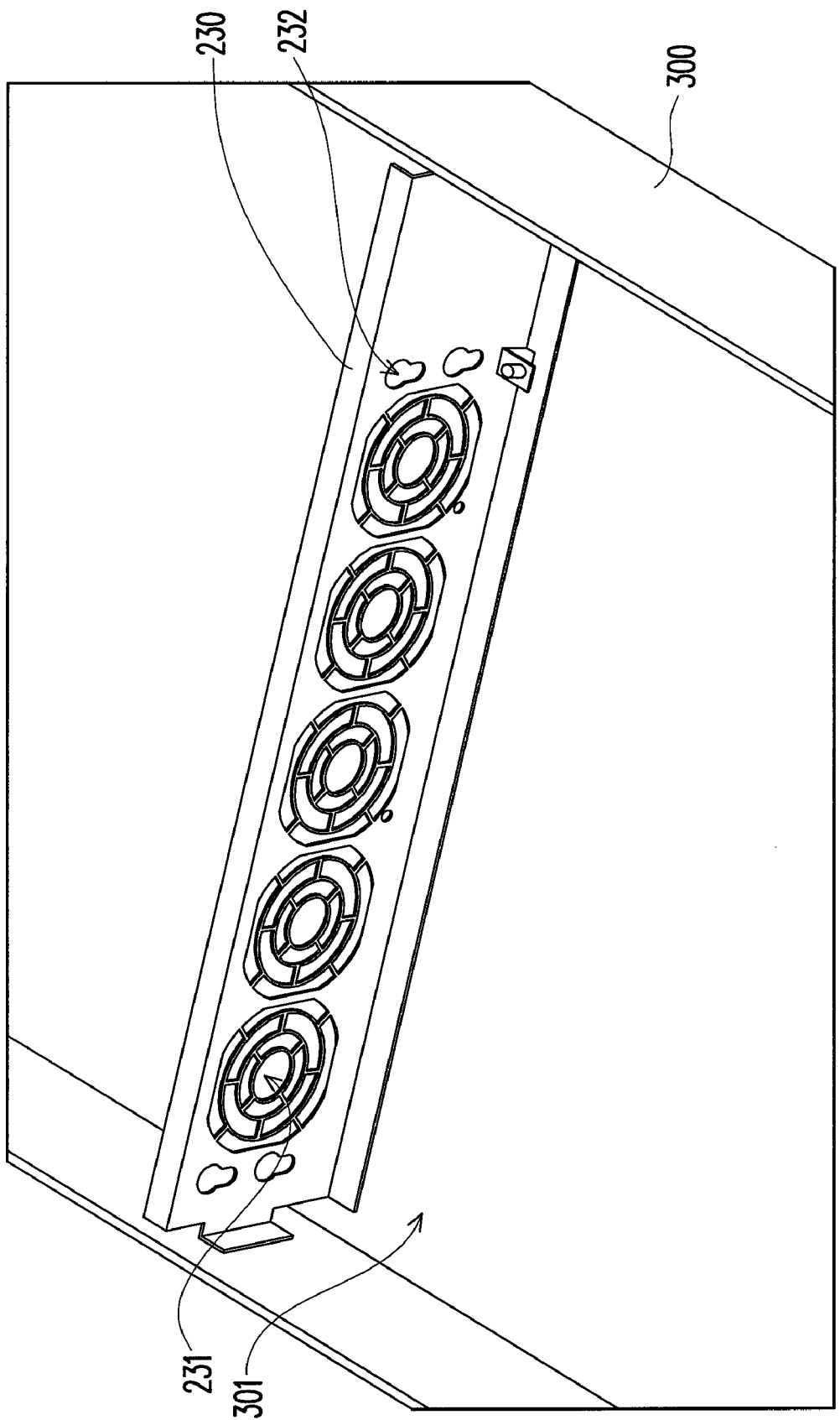
FIG. 4 is a three-dimensional view of a back slab according to an embodiment of the present invention.
Figure 5:
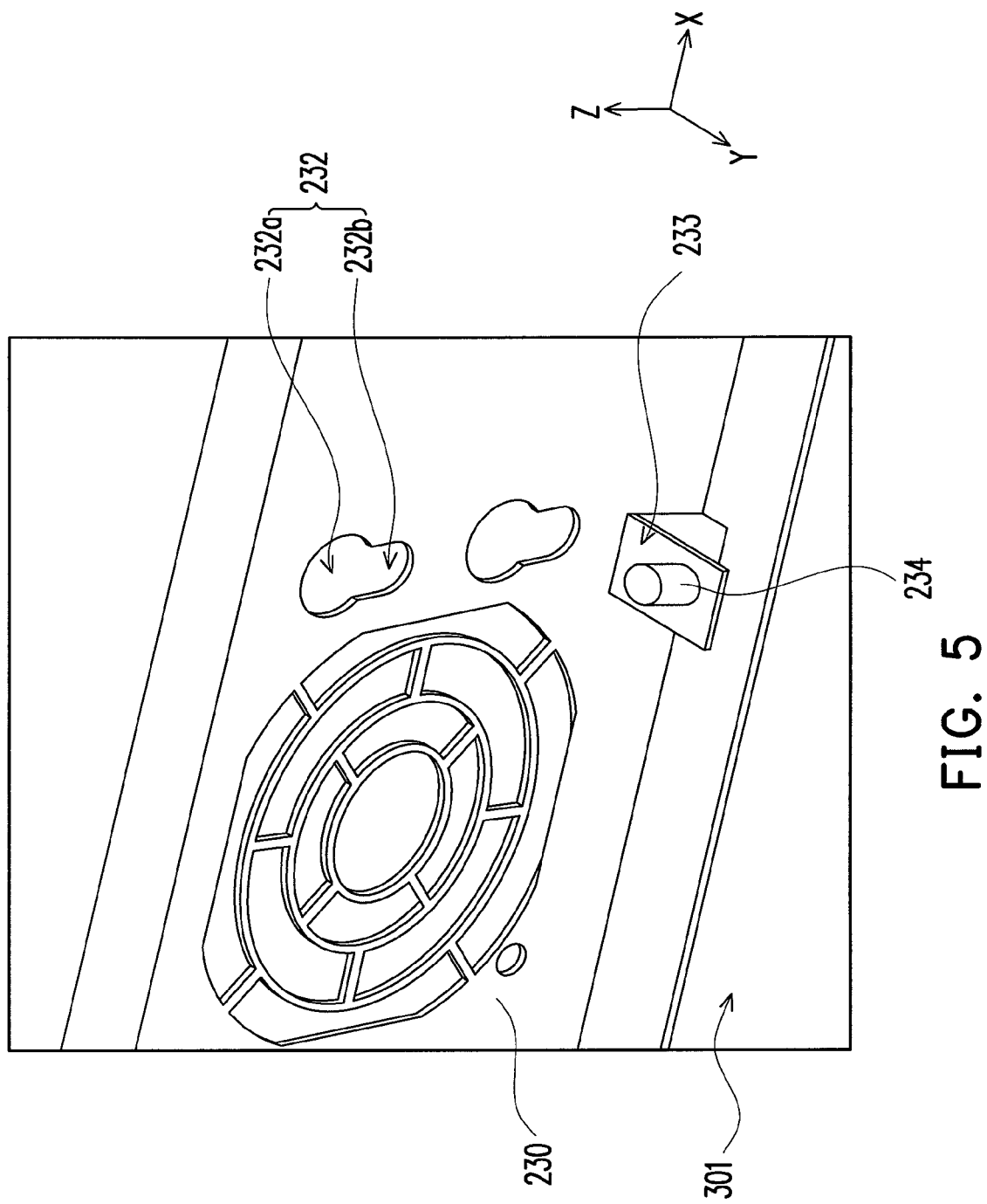
FIG. 5 is a partial enlarged view of a back slab according to an embodiment of the present invention.

A three-dimensional view of the back slab 230 of the assembled fan frame 200 according to the present invention is shown in FIG. 4. Referring to FIG. 4, the back slab 230 is vertically mounted on a surface 301 of a case body 300 (for example, the bottom surface of the case body 300), and the back slab 230 faces the fixing slab 211 in parallel (as shown in FIG. 2). At least one second vent 231 and a plurality of second assembling holes 232 are disposed on the back slab 230. FIG. 5 is a partial enlarged view of the back slab 230. Referring to FIG. 5, the second assembling hole 232 can be a gourdshaped hole (or key hole). The second assembling hole 232 includes a first aperture portion 232a and a second aperture portion 232b, in which an aperture of the first aperture portion 232a is larger than an aperture of the second aperture portion 232b. The back slab 230 also includes a plurality of third folded boards 233 and a plurality of third assemblies 234 protruded from the third folded boards 233. In this embodiment, the third folded boards 233 and the back slab 230 can be formed into one piece, and the third folded boards 233 vertically protrude from the back slab 230. The third assemblies 234 (e.g., clipping parts such as pins or tenons) face to the direction of z-axis and are vertical to the surface 301 of the case body (X-Y plane as shown in FIG. 5). The detailed description of an assembling manner of the back slab 230 and the framework 210 of this embodiment is described below.

Figure 6:
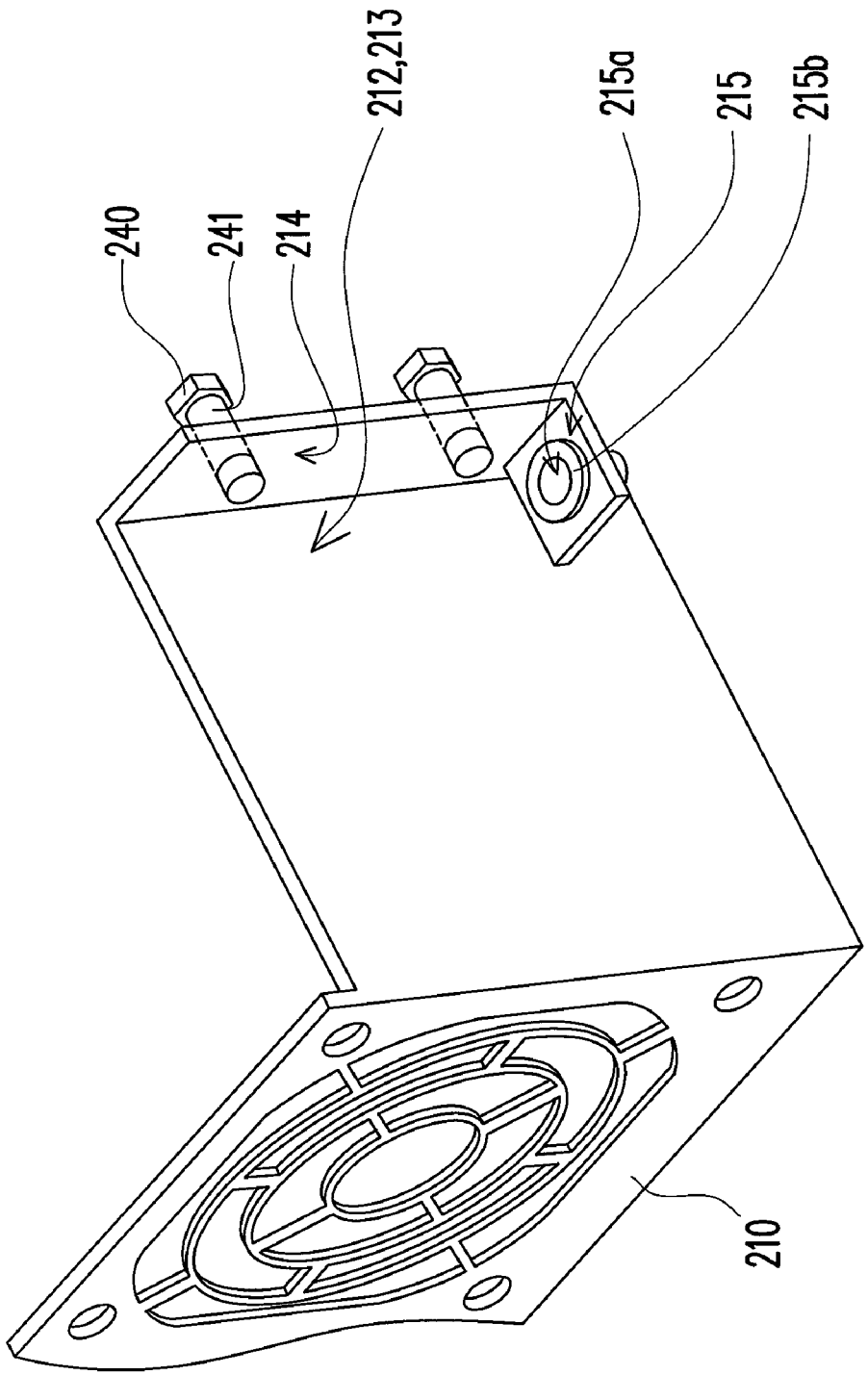
FIG. 6 is a partial enlarged view of a framework according to an embodiment of the present invention.

FIG. 6 is a partial enlarged view of the framework 210. As shown in FIG. 6, the framework 210 includes a plurality of first folded boards 214. The first folded boards 214 are vertically connected to the first side wall 212 and the second side wall 213, and protruded from the first side wall 212 and the second side wall 213 respectively. Referring to FIG. 5 and FIG. 6 at the same time, in this embodiment, the first folded boards 214 and the framework 210 can be formed into one piece, while a plurality of the second assemblies 240 are installed on the first folded board 214, and protruded to the back slab 230. Each of the second assemblies 240 includes a rod body 241 (e.g. assemblies such as screws or pins), and a head external diameter of the rod body 241 is smaller than the aperture of the first aperture portion 232a as shown in FIG. 5, and the head external diameter of the rod body 241 is larger than the aperture of the second aperture portion 232b. When the framework 210 is assembled with the back slab 230, the framework 210 can be fixed on the back slab 230 quickly only by penetrating the head of the rod body 241 of the second assembly 240 through the first aperture portion 232a of the second assembling hole 232, performing a clipping action to the direction of the second aperture portion 232b and clipping the second assembly 240 into the second aperture portion 232b. The framework 210 can be easily disassembled from the back slab 230 by moving at an inverse direction.

In addition, the framework 210 of the assembled fan frame 200 of the present invention also includes a plurality of second folded boards 215 and a plurality of third assembling holes 215a on the second folded boards 215. The second folded boards 215 are vertically connected with the first folded boards 214 described above respectively, all formed into one piece with the first folded boards 214 on the framework 210 and also protruded from the first side wall 212 and the second side wall 213 (as shown in FIG. 6). When the framework 210 is assembled with the back slab 230, in addition to clipping the second assemblies 240 into the corresponding second assembling holes 232, the third assemblies 234 also penetrate through the corresponding assembling holes 215a on the second folded boards 215. In order to separate the third assembly 234 and the third assembling hole 215a, a shockproof washer 215b may be disposed within the third assembling hole 215a. The clipping between the framework 210 and the back slab 230 is more stable as a result of the effect of the shockproof washer 215b, and the shockproof washer 215b can absorb the shock generated by the operation of the fan module 250.

Figure 7:
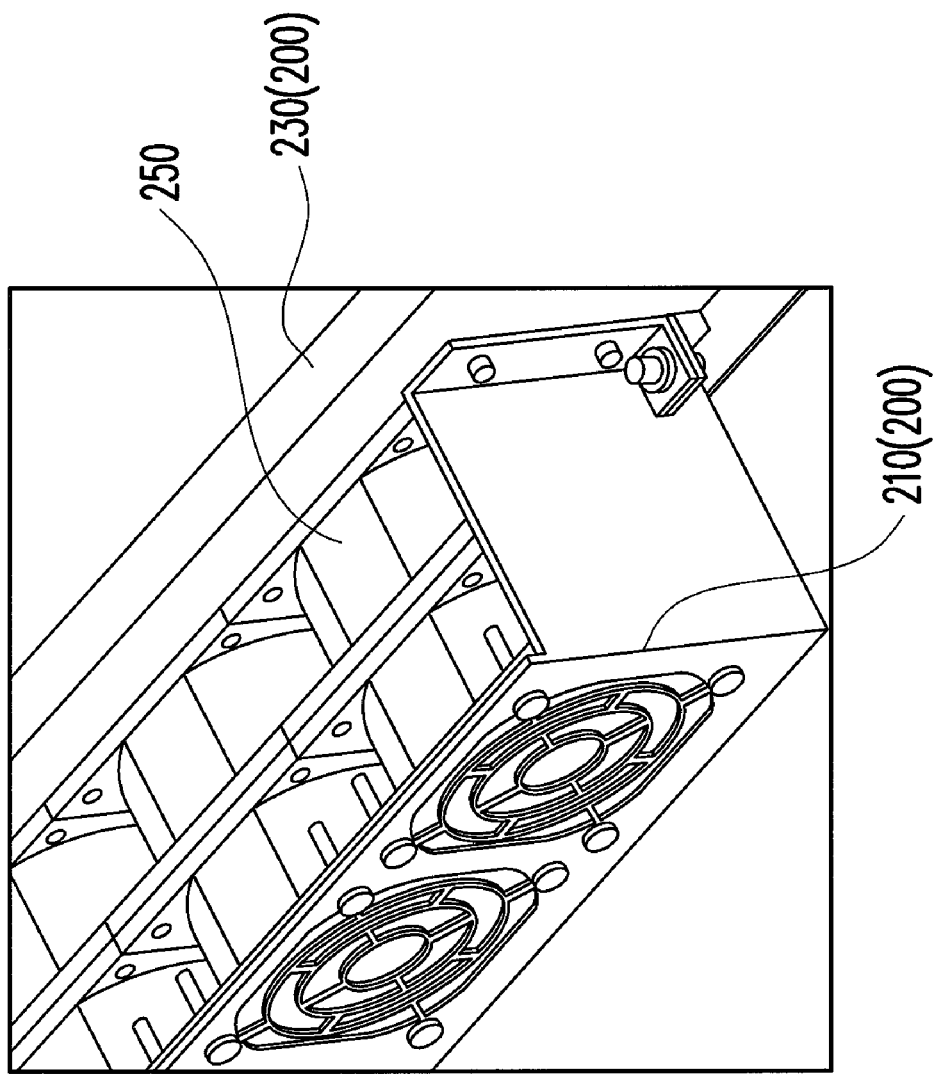
FIG. 7 is an assembled three-dimensional view of an assembled fan frame and a fan module according to an embodiment of the present invention.

FIG. 7 is an assembled three-dimensional view of an assembled fan frame and a fan module. It can be known from FIG. 7 together with the above illustration, the fan module 250 is assembled and secured with the framework 210 by one side, and the framework 210 is also fixed on the back slab 230 in a clipping manner, such that the fan module 250 required for the heat dissipation may be quickly installed in position. Because no structural contact or any locking part exists between the fan module 250 and the back slab 230, instead, the fan module 250 is secured on the framework 210 by one side, the contact area of the fan module 250 against the assembled fan frame 200 is decreased, and the shock generated by the operation of the fan module 250 is also decreased, as compared with the design that the framework has frame walls at its four sides in the prior art.

In view of the above, the assembled fan frame of the present invention decreases the shock generated by the operation of the fan by the design that the contact area between the fan module and the assembled fan frame is decreased and the shockproof washer is provided. In addition, when assembling the assembled fan frame, the fan frame can be assembled and disassembled quickly without through a plurality of assembling accessories (e.g., spring sheet or mounting bracket in the prior art), thus increasing the convenience and practicability of the present invention in application. The design of the frame formed into one piece makes the structure simple and further decreases the manufacturing cost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An assembled fan frame suitable for a case body, comprising:
    a framework, comprising a fixing slab, a first side wall and a second side wall facing each other, wherein the fixing slab is connected between the first side wall and the second side wall, the fixing slab, the first side wall, and the second side wall define an accommodation space to accommodate at least one fan module, the fixing slab has at least one first vent and a plurality of first assembling holes which are disposed around the first vent, and each outlet of the fan module faces each of the first vents of the fixing slab;
    a plurality of first assemblies, disposed through the first assembling holes and fastening the fan modules on the fixing slab;
    a back slab, vertically mounted on a surface of the case body and facing the fixing slab, and comprising at least one second vent and a plurality of second assembling holes; and
    a plurality of second assemblies, disposed through the second assembling holes and detachably fixing the framework on the back slab, wherein the framework further comprises a plurality of first folded boards vertically connected to the first side wall and the second side wall respectively, and the second assemblies are assembled on the first folded boards and protruded to the back slab.

2. The assembled fan frame according to claim 1, wherein the framework is an integrally formed n-shaped framework.

3. The assembled fan frame according to claim 1, wherein the first assemblies comprise screws, pins, or tenons.

4. The assembled fan frame according to claim 1, wherein the second assembling holes are gourdshaped holes each having a first aperture portion and a second aperture portion, and each of the second assemblies is adapted to be disposed through the first aperture portion and fixed in the second aperture portion.

5. The assembled fan frame according to claim 4, wherein the second assemblies comprise screws or pins, each of the second assemblies comprises a rod body, and a head external diameter of the rod body is smaller than an aperture of the first aperture portion and larger than an aperture of the second aperture portion.

6. The assembled fan frame according to claim 1, wherein the framework further comprises a plurality of second folded boards and a plurality of third assembling holes on the second folded boards, the second folded boards are vertically connected with the first folded boards respectively, the back slab further comprises a plurality of third folded boards and a plurality of third assemblies protruded from the third folded boards, and the third assemblies are vertical to the surface of the case body and disposed through the third assembling holes.

7. The assembled fan frame according to claim 6, wherein the third assemblies comprise pins or tenons, and a shockproof washer is disposed within each of the third assembling holes to separate each of the third assemblies and each of the third assembling holes.

8. The assembled fan frame according to claim 6, wherein the first folded boards and the second folded boards are integrally formed on the framework and protruded from the first side wall and the second side wall respectively.

9. The assembled fan frame according to claim 6, wherein the third folded boards are integrally formed on the back slab, and vertically protruded from the back slab.

* * * * *